US008219124B2

(12) United States Patent
Panico et al.

(10) Patent No.: US 8,219,124 B2
(45) Date of Patent: Jul. 10, 2012

(54) METHOD FOR PLANNING A CELLULAR MOBILE TELECOMMUNICATIONS NETWORK

(75) Inventors: Massimiliano Panico, Turin (IT); Indro Francalanci, Turin (IT)

(73) Assignee: Telecom Italia S.p.A., Milan (IT)

( * ) Notice: Subject to any disclaimer, the term of this patent is extended or adjusted under 35 U.S.C. 154(b) by 414 days.

(21) Appl. No.: 12/085,272

(22) PCT Filed: Nov. 21, 2005

(86) PCT No.: PCT/EP2005/012442
§ 371 (c)(1),
(2), (4) Date: Aug. 28, 2009

(87) PCT Pub. No.: WO2007/057046
PCT Pub. Date: May 24, 2007

(65) Prior Publication Data
US 2009/0305709 A1     Dec. 10, 2009

(51) Int. Cl.
*H04W 16/00*     (2009.01)
(52) U.S. Cl. ........ 455/466; 455/446; 455/423; 370/342; 370/335; 370/441; 370/465; 370/332
(58) Field of Classification Search .................. 455/466, 455/446; 370/342, 335, 441, 465, 332
See application file for complete search history.

(56) References Cited

U.S. PATENT DOCUMENTS

2003/0086405 A1 *   5/2003   Silva et al. ..................... 370/342
2003/0087641 A1 *   5/2003   Gustafsson ................... 455/446

(Continued)

FOREIGN PATENT DOCUMENTS
EP     1 294 208 A1     3/2003
(Continued)

OTHER PUBLICATIONS

R. Menolascino et al.; Project Title: "STORMS: Software Tools for the Optimisation of Resources in Mobiles Systems", Project No. AC016, A016/CSE/MRM/DR/P/091/a1, pp. i-vii and 1-57, (1999).

(Continued)

*Primary Examiner* — Marivelisse Santiago Cordero
*Assistant Examiner* — Jean Chang
(74) *Attorney, Agent, or Firm* — Finnegan, Henderson, Farabow, Garrett & Dunner, L.L.P.

(57) ABSTRACT

A method for planning cellular mobile telecommunications network including at least one network cell and intended to provide network services to user equipment located in the network cell, wherein the network services include at least one network service deliverable at a plurality of provisioning rates, including evaluating an uplink coverage of the network in a predetermined service area. The evaluation of the uplink coverage includes: a) forecasting a number of user equipment located in the service area; b) setting a current provisioning rate to the highest of provisioning rates; c) estimating a power required for each user equipment for accessing the at least one network service in the service area at the current provisioning rate; and d) comparing the estimated required power to a maximum power deliverable by each user equipment. If the estimated required power exceeds the maximum deliverable power: e) determining a reduced service area wherein the estimated power required to each user equipment of a reduced number of user equipment located therein for accessing the at least one network service at the current provisioning rate does not exceed the maximum deliverable power; f) updating the current provisioning rate to the immediately lower provisioning rate of the plurality; and g) repeating steps c) and d) and, if required, steps e) and f).

12 Claims, 7 Drawing Sheets

U.S. PATENT DOCUMENTS

2003/0114127 A1* 6/2003 Baldwin .................. 455/245.1
2004/0014476 A1 1/2004 Barberis et al.

FOREIGN PATENT DOCUMENTS

EP 1 496 717 A2 1/2005
WO WO-2005/062647 7/2005

OTHER PUBLICATIONS

3rd Generation Partnership Project; "Technical Specification Group Radio Access Networks; RF system scenarios", (Release 1999), 3GPP TR 25.942 V3.0.0, pp. 1-110, Mar. 2001.

* cited by examiner

METHOD FOR PLANNING A CELLULAR MOBILE TELECOMMUNICATIONS NETWORK

CROSS REFERENCE TO RELATED APPLICATION

This application is a national phase application based on PCT/EP2005/012442 filed Nov. 21, 2005, the content of which is incorporated herein by reference.

FIELD OF THE INVENTION

The present invention generally relates to the field of telecommunications, particularly to mobile telecommunications networks, allowing communications between mobile users. More specifically, the invention relates to cellular mobile telecommunications networks, particularly to radio telecommunications networks, and even more particularly to those networks that adopt a Code Division Multiple Access (CDMA) or Wideband CDMA (WCDMA) access scheme, such as cellular networks of the third generation, like those complying with the Universal Mobile Telecommunications System (UMTS).

BACKGROUND OF THE INVENTION

Mobile telecommunications networks are usually arranged according to a cellular structure comprising a plurality of cells, each cell being defined as the set of elementary territory areas (also referred to as "pixels") served by the radio-electric signal radiated from a respective Base Radio Station (BRS), or antenna.

Among the known cellular networks, networks using the CDMA or WCDMA technique have the peculiarity that a same frequency band (or "channel") can be re-used in the various cells. Therefore, the passage of a mobile communications terminal from one cell to another, contiguous cell (an event called "handover") can be managed by using the same frequency, according to a mechanism called "soft-handover"; this mechanism provides that, in particular geographic areas, called "soft-handover areas" or "macro-diversity areas", the mobile communications terminal is able to decode signals from, and therefore to exchange information with many antennas and consequently with many BRSs.

The location of the macro-diversity areas and their dimensioning are highly important factors for the correct operation and dimensioning of the network cells' apparatuses: a mobile communications terminal operating in macro-diversity uses resources of all the BRSs with which it is simultaneously connected, thus the terminal in macro-diversity uses more resources than those actually necessary for allowing the communications.

A further peculiarity of UMTS networks is that such networks are adapted to provide a plurality of different network services, such as, for example, telephony, fax, video-telephony, Internet access and Web browsing, streaming and so on. Each one of such services generally has characteristics in terms of speed (number of bits per second) and traffic (amount, symmetrical or asymmetrical) that are specific for the service under examination.

The dimensioning of the cells should therefore take into account both the characteristics of each service, and the possible associations of services over a single radio carrier, as provided for by the CDMA/WCDMA access technique.

Moreover, like every cellular radio-mobile system, also a UMTS network has common broadcast control channels in the whole cell area. Such channels convey system information, that are necessary for radio apparatuses (receivers) of the mobile communications terminals.

Due to the networks' peculiarities, the planning of UMTS networks is a complex task, requiring approaches that are substantially different from those used for previous cellular mobile telecommunications networks, particularly second-generation cellular networks like those complying with the Global System for Mobile Communication (GSM) standard, or with the Interim Standard (IS95).

In general, in view of a current network deployment, the planning process aims to produce, as results or outputs, the proper positioning of the BRSs in the geographic area under examination, and also allows determining the set of radio-electric cell parameters (e.g., antenna tilt, azimuth of the direction of maximum gain, radio power, etc.) and the allocation of the radio resources assigned to the network operator (for example, radio carriers). Such outputs are determined by the planning process in compliance with planning objectives, such as, for example:

granted extension of territory covered by the network service, within an area under planning;

maximization of the traffic to be managed among those provided within the area under planning.

Various planning techniques for UMTS networks are known; according to the followed approach, these techniques can be grouped into two different classes: statistical planning techniques and deterministic planning techniques.

Statistical planning techniques are mainly based on an approach of the Montecarlo type (refer for example to the document 3GPP TR 25.942 v3.0.0 2001-06—"RF System Scenarios—Release 1999" specification). The term "Montecarlo simulation" usually denotes a static simulation composed of a set of statistically independent snapshots. After having fixed the scenario being studied, each snapshot consists in realizing a stochastic process generated starting from different distributions of users in the area being examined. At the end of every snapshot, network performance indicators are provided as results, and the procedure ends with the statistical analysis of various performance indicators provided by every snapshot. The number of snapshots shall be enough to guarantee statistical stability for the planning results. This methodology is rather specific, and it is particularly adapted for examining performances of a UMTS network of relatively limited geographic width; owing to its intrinsic slowness, due to the statistical convergence of results, this technique is not suitable for the analysis of UMTS networks intended to cover geographical areas comparable with those of an entire nation, such as, for example, Italy.

Though keeping the characteristic of a static analysis, the deterministic planning techniques systematically take into account all pixels of the territory on which the network will be planned. Differently from statistical methods, the deterministic methods exploit, as input data, a single users distribution, and a single simulation is carried out, without the need of a statistical aggregations of the results. Deterministic planning techniques are more suitable for planning UMTS networks intended to cover relatively large geographical areas, even if the planning result is generally less adherent to the evolving reality.

Irrespective of the approach followed, one of the phases of the methods for planning a cellular mobile telecommunications network of the type herein considered is the planning/evaluation of the network coverage in uplink, also referred to as "power control on the uplink", i.e. the planning/evaluation of the coverage in the radio link from UEs located on the pixels of the area under planning to the BRSs. In this phase, the transmission power required per traffic channel to the UEs located on the pixels of the area under planning is calculated. For each pixel belonging to the area under planning, and for each network service, the cell is determined which requires the lowest transmission power to an hypothetic UE located on that pixel and using that network service: the cell thus determined represents the serving cell of that pixel, as far as that network service is considered. If the lowest transmission power required to the UEs calculated in this phase exceeds the maximum power deliverable by the generic UE (a parameter which is predetermined and forms one of the inputs to the planning process), the pixel under consideration is put in outage for excessive required power in uplink: in other words, given the current network configuration, a generic UE located on that pixel will not be in condition of using that network service, because the transmission power that would be necessary for doing this is too high. The set of pixels for which the generic cell is the serving cell in respect of the generic network service forms the "cell uplink service area" of that cell for that service in uplink. The set of cell uplink service areas for the various cells of the area under planning and for the various network services forms the "network global uplink area". The set of pixels put in outage for excessive required power in uplink, for the generic network service, forms the "service outage area" in uplink.

Essentially, in the uplink power control phase, a plurality of sets of maps is determined, one set of maps for each network service; the generic set of maps includes in turn a number of maps equal to the number of cells of the area under planning: each map is formed by those pixels for which the respective cell (the serving cell) requires the lowest power in the uplink (there is a minimum threshold represented by the minimum UE transmission power), those pixels for which the required transmission power in uplink exceeds the predetermined maximum transmission power of the generic UE, for the generic network service, being eliminated.

In a following phase of the planning process, referred to as "power control on the downlink", the planning/evaluation of the network coverage in the radio link from the BRSs to the UEs located on the pixels of the area under planning is carried out, so to ascertain whether the downlink is a limiting factor. For each cell of the area under planning, the transmission power per traffic channel that the generic cell should deliver is calculated, for each pixel belonging to the cell uplink service area of that cell and for each network service (i.e., for example, for the telephony, facsimile, video-telephony, Internet access, e.g., Web browsing, services). If the calculated power, for the generic pixel, exceeds the maximum power that the serving cell can deliver for a traffic channel in respect of the considered network service, that pixel is put "out-of-service" ("outage") for insufficient power in the downlink. In other words, even if the generic UE located on that pixel would be able to deliver the necessary transmission power for communicating with the BRS, it is the BRS that is not in condition to sustain the necessary transmission power for providing that service. The set of pixels, belonging to the service area of the generic cell in respect of the generic network service, not being in outage, forms the overall service area of the cell in respect of that network service. The union of all the overall service areas for all the network services and for all the cells of the area under planning is referred to as the network global downlink area of the network (in the area under planning).

The downlink power control phase also encompasses a cell "capacity check" on the downlink: the overall power that, according to the above-mentioned calculations, is estimated to be required to the generic cell is compared to the maximum power that the (power amplifiers of the BRS of the) cell can deliver: if the calculated overall required power exceeds the maximum power that the cell can deliver, the cell does not pass the capacity check, and it might be necessary to modify the traffic distribution and/or the locations of the cells in the area under planning.

A UMTS network planning methodology is described in the document AC016/CSE/DR/P/091 entitled "STORMS Project Final Report", 1997, developed under the STORMS (Software Tools for the Optimization of Resources in Mobile Systems) project, promoted by the European Union. The planning methodology described in that document provides for an analysis of the uplink capacity of the cells (BRSs) based on interference/noise limitations. The maximum cell capacity in uplink, in terms of maximum number of active calls per cell and per service type (CA, CB, . . . , CN) is determined by solving the following linear system:

$$\eta = (1 + f_{extra}) \sum_{i=A}^{N} C_i SAF_i^{UF} SINR_i$$

$$\frac{C_i}{C_{REf}} = k_i$$

$$i = A, B, \ldots, N$$

where $\eta$ is a multi-service fractional load factor (with respect to the full load condition), assumed as the nominal load of the cell, $f_{extra}$ is a normalized inter-cell interference factor (which is characteristic of the environment), $SAF_i^{UL}$ is a service activity factor in uplink for the generic network service, and $SINR_i$ is a target signal to interference plus noise ratio.

Factors $k_i$ describe the requested traffic mix in terms of ratio between the maximum active calls per each service and a reference one. These parameters have to be consistent with the correspondent traffic mix figures, which describe the offered traffic mix (in Erl) for the pixel under study. To derive these parameters, an iterative procedure is adopted. In fact, factors $k_i$ refer to the partitioning of the active calls among different services on the cell area, i.e., they correspond to the maximum number of circuits required to carry the offered traffic load on the cell area.

Thus, to evaluate them, the traffic load of the cell should be known. To derive it from the traffic load per pixel, which is the available input data, the cell dimension should be known. But this is in fact the final goal of the evaluation process. To solve this plight, an iterative process is proposed. A first, rough estimate of the cell area (i.e., number of pixels) is produced, and the correspondent traffic load per service is evaluated by multiplying the traffic value per service per pixel by the estimated number of pixels of the cell. Then, the traffic load is converted into the equivalent maximum number of active calls by means of the Erlang-B formula:

Max_Number_of_Users=Erlang_$B$(Traffic_load; Loss_Probability).

The assumed loss probability is 0.01. Based on this estimate for the cell traffic load, factors $k_i$ are evaluated and substituted in the previous equation of $\eta$. A new value for the cell capacity is obtained by solving the equation. The process is re-iterated (using the equation solution as a new starting point for the estimate of $k_i$) till it reaches the convergence. Finally, the correspondent maximum cell capacity (in Erl) is obtained by applying the Erlang-B formula to the final result of the previous step (by imposing a given loss probability).

SUMMARY OF THE INVENTION

The Applicant has observed that the methods known in the art for planning a UMTS network, particularly concerning the uplink power control phase, suffer from limitations that impact the efficiency of the whole planning method, and the networks built following such methods are as a consequence not optimized.

In particular, the Applicant has observed that in CDMA/WCDMA networks, like those complying with the UMTS standard, network services can be classified, in terms of provisioning rate, e.g. bit-rate, into two broad categories: (i) Non-Guaranteed bit-rate Services (NGS) and (ii) Guaranteed bit-rate Services (GS). NGSs include for example packet-switched network services, or circuit-switched network services that allow being assigned a bandwidth that varies in time (for example, Web browsing services, messaging services, file transfer services, and the like); GSs include for example packet-switched services or circuit-switched services that are characterized by a high sensitivity to delays in the radio link (for example, video-call services, vocal calls, and the like). While GSs have a fixed bit-rate, NGSs allow the bit-rate to be down-scaled: for example, in case of network congestion, the generic cell can reduce the bit-rate of the NGSs, so as to guarantee the target bit-rate to the GSs.

The Applicant has observed that prior-art network planning methods, particularly as far as the uplink power control phase is concerned, like for example the uplink coverage planning and/or evaluation method described in the cited document, do not take into account the different nature of the service intended to be offered by the network under planning: in those known methods, all the network services are considered de-facto as GSs, i.e. as services whose bit-rate is fixed (equal to the specific maximum bit-rate for each network service) and cannot be scaled down; in the planning process, all the network services are thus indiscriminately treated as GSs, with bit-rate equal to the specific maximum bit-rate for each network service.

The Applicant has observed that this is not true-to-reality, and may contrast with the network behavior in the real environment; the Applicant has found that a generic cell's service area in respect of a generic NGS, in uplink, can actually be regarded as the union of different sub-areas, in each of which a respective service bit-rate is guaranteed, with a sub-area wherein the maximum bit-rate is guaranteed, and one or more other sub-areas wherein reduced bit-rates are guaranteed.

For example, the uplink network service area calculated conventionally for a generic network service will be the set of pixels in which it is guaranteed that the UEs can access that service at the maximum bit-rate, even if, in the practice, the service considered is susceptible of being enjoyed at a reduced bit-rate, in a wider area. For example, for a Web-browsing service, the Web-browsing uplink service area typically calculated for the generic cell may include only the pixels wherein the UEs can sustain the maximum bit-rate of 384 Kbit/s, all the remaining pixels being considered in outage, whereas in the practice the UEs could enjoy the service in a wider area, even if at reduced bit rates, e.g. 128 Kbit/s or 64 Kbit/s.

The Applicant has found that adopting the known methods, the results of the planning process, in terms of service areas for the cells, may be strongly affected, and this is especially true when services characterized by a high provisioning rate unbalance between the downlink and the uplink. By assuming that the bit-rate of NGSs is fixed may for example lead the planning process to be excessively conservative, indicating for example the necessity of installing new network sites (BRSs) even if they would not be strictly necessary, with the consequent increase of costs for the network operator.

In view of the outlined state of the art and related problems, drawbacks and limitations, the Applicant has tackled the general problem of improving the known planning methods of cellular mobile telecommunications networks.

In particular, the Applicant has tackled the problem of how to properly carry on the phases for the uplink analysis in the planning process of a CDMA network.

The Applicant has found that, by determining different uplink service areas for the different services, depending on whether it is a GS or a NGS service and, in the latter case, depending on the different possible provisioning rates of the service, allows properly evaluating the uplink coverage of the network in the considered geographic area. The different uplink service areas are determined by taking into account the power required to the user equipments for accessing the different services at the possible provisioning rates.

According to a first aspect thereof, the present invention thus relates to a method for planning a cellular mobile telecommunications network that includes at least one network cell and is intended to provide network services to user equipment located in said network cell, wherein the network services include at least one network service deliverable at a plurality of provisioning rates.

Essentially, the method includes evaluating an uplink coverage of the network in a predetermined service area, and is characterized in that said evaluating includes:

a) forecasting a number of user equipments located in said service area;

b) setting a current provisioning rate to the highest of said provisioning rates;

c) estimating a power required to each of the user equipments for accessing the at least one network service at the current provisioning rate;

d) comparing the estimated required power to a maximum power deliverable by each of the user equipments; and, if the estimated required power exceeds the maximum deliverable power:

e) determining a reduced service area wherein an estimated power required to each user equipment of a reduced number of user equipments for accessing the at least one network service at the current provisioning rate does not exceed the maximum deliverable power;

f) updating the current provisioning rate to the immediately lower provisioning rate of said plurality; and g) repeating steps c) and d) and, if required, steps e) and f).

The predetermined service area can be established during an admission control phase of the planning, starting from a best-server cell service area for the at least one network cell, calculated on the basis of a power level of a predetermined channel. In this case, step c) preferably includes:

c1) initializing, for the at least one network cell, a transmission power for each user equipment located in the service area;

c2) estimating a total power received by the at least one network cell from the user equipments located in the service area and using the at least one network service;

c3) based on the estimated total received power, varying the transmission power required to each user equipment located in the service area in order to reach a target quality of service constraint for the at least one network service; and c4) iterating the steps c2) and c3) until a stability condition is reached wherein the transmission power variation for at least a predetermined fraction of the user equipments located in the service area is lower than a predetermined threshold.

The predetermined service area can be alternatively a best-server cell service area for the at least one network cell, calculated on the basis of a power level of a predetermined channel. In this case, step c) preferably includes:

c1) initializing, for the at least one network cell, a service area and a transmission power for each user equipment located in the service area;

c2) estimating a total power received by the at least one network cell from the user equipments located in the service area and using the at least one network service;

c3) based on the estimated total received power, varying the transmission powers required to each user equipment located in the service area in order to reach a target quality of service constraint for the at least one network service;

c4) iterating said steps c2) and c3) until a stability condition is reached wherein the transmission power variation for at least a predetermined fraction of the user equipments located in the service area is lower than a predetermined threshold;

c5) calculating a total received power corresponding to the transmission powers at the end of step c4);

c6) calculating an uplink load factor corresponding to the total received power calculated in step c5);

c7) ascertaining whether the calculated uplink load factor is lower than a maximum uplink load factor, and, in the negative case:

c8) restricting the service area; and c9) repeating the steps from c2) to c7).

The step e) preferably includes:

e1) memorizing the reduced service area;

e2) calculating a service outage area in respect of the at least one network service.

The step of comparing the estimated required power to a maximum power deliverable by each of the user equipments preferably includes varying the maximum deliverable power as a consequence of the step of updating the provisioning rate for the at least one service.

The step of varying the maximum deliverable power preferably includes:

defining a first and at least one second maximum deliverable power thresholds, the first threshold being lower than the second threshold;

initializing the maximum deliverable power to a value corresponding to the first power threshold; and as a consequence of said updating the provisioning rate for the at least one service, setting the maximum deliverable power to the second power threshold.

The transmission power for each user equipment is preferably initialized to zero.

The present invention further relates to a data processing system comprising means adapted to carry out the steps of the method previously described. Moreover, the present invention further relates a computer program comprising instructions for carrying out all the steps of the method previously described when said computer program is executed on a computer system.

The present invention also relates to a cellular mobile telecommunications network including at least one network cell and intended to provide network services to users located in said network cell, wherein the network services include at least one network service, the network having a service area in respect of the at least one service obtained by applying the method previously described.

BRIEF DESCRIPTION OF THE DRAWINGS

The features and advantages of the present invention will be made apparent by the following detailed description of an embodiment thereof, provided merely by way of non-limitative example, description that will be conducted making reference to the annexed drawings, wherein.

DETAILED DESCRIPTION OF THE PREFERRED EMBODIMENT(S) OF THE INVENTION

Figure 1:
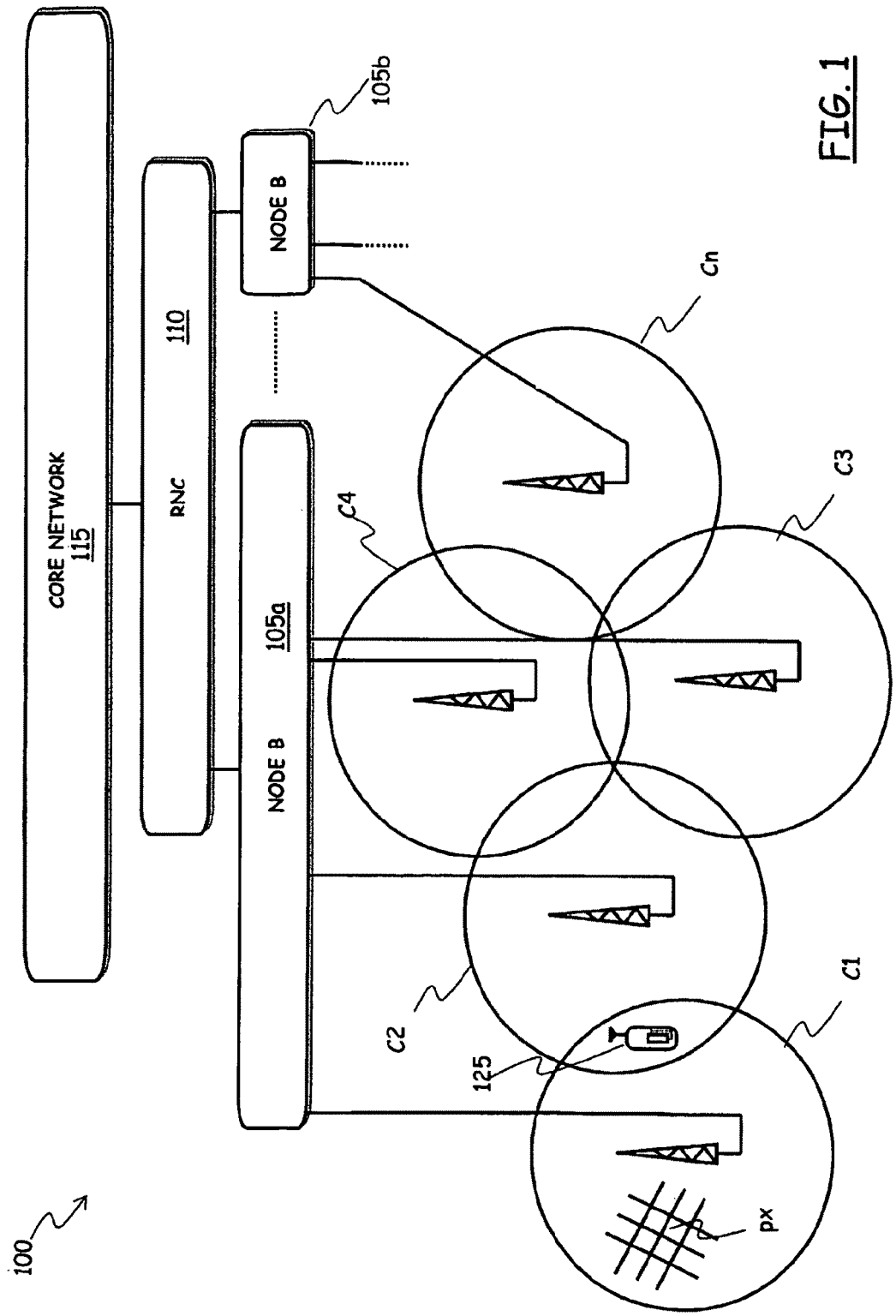
FIG. 1 pictorially shows a portion of a UMTS network being planned, intended to cover a respective geographic area, with a plurality of network cells.

Referring to the drawings, in FIG. 1 there is schematically depicted a portion of a CDMA network, particularly a UMTS network under planning, the network portion being intended to provide cellular mobile communications capability within a given geographic area.

The UMTS network portion under consideration, identified globally by reference numeral 100, comprises a plurality of cells C1, C2, C3, C4, . . . , Cn (schematically depicted as circles), each one having a respective area coverage (the area of the circles). The cells C1, C2, C3, C4, . . . , Cn are each one made up of a plurality of pixels px, i.e., they are the set of geographic points covered and served by the radio electromagnetic signal irradiated by a respective cell's BRS, schematized in the drawing as an antenna.

Usually, groups of three to six cells (on average) are managed by a network entity called "Node B", such as the Node Bs 105a and 105b in the drawing (where, merely by way of example, it is assumed that the cells C1, C2, C3, and C4, are managed by the Node B 105a, and that the cell Cn is managed by the Node B 105b).

Groups of Node Bs are managed by a Radio Network Controller (RNC), like the RNC 110 shown in the drawing; the RNCs are connected to the core UMTS network 115.

A generic UE, like the UE 125 depicted as located within the cell C1, can receive signals transmitted by the transmitters, and irradiated by the antennas, of different cells, e.g. the cells C1 and C2, and is able to differentiate among them.

This differentiation of signals coming from different transmitters is made possible by the adoption, in the UMTS standard, of the CDMA/WCDMA access technique. Without entering into excessive details, known to those skilled in the art and not relevant to the understanding of the present invention embodiment, each transmitter (particularly, the transmitter of the generic network cell) implements a spreading and a subsequent scrambling of the signal to be transmitted. The signal (data) to be transmitted, having a given symbol rate (usually called the bit rate) is first submitted to a spreading process, using a spreading code, in order to "widen" its spectrum and distribute (and thus lower) its power over the whole channel bandwidth. The spreading code has a higher number of symbols than the signal to be transmitted, thus the spread signal has a symbol rate (a "chip rate", in jargon) higher than the bit rate of the initial signal. The spread signal is then submitted to a scrambling process, using a scrambling code or scrambling sequence. The signal scrambling process does not change the chip rate, thus the signal to be transmitted "over-the-air" has a chip rate equal to that of the spread signal. The scrambling process is used for making signals transmitted by the transmitters of different cells distinguishable (provided that the scrambling codes are properly assigned to the cells).

The geographic area represented schematically in FIG. 1 is assumed to be an area of the UMTS network to be planned.

Figure 2:
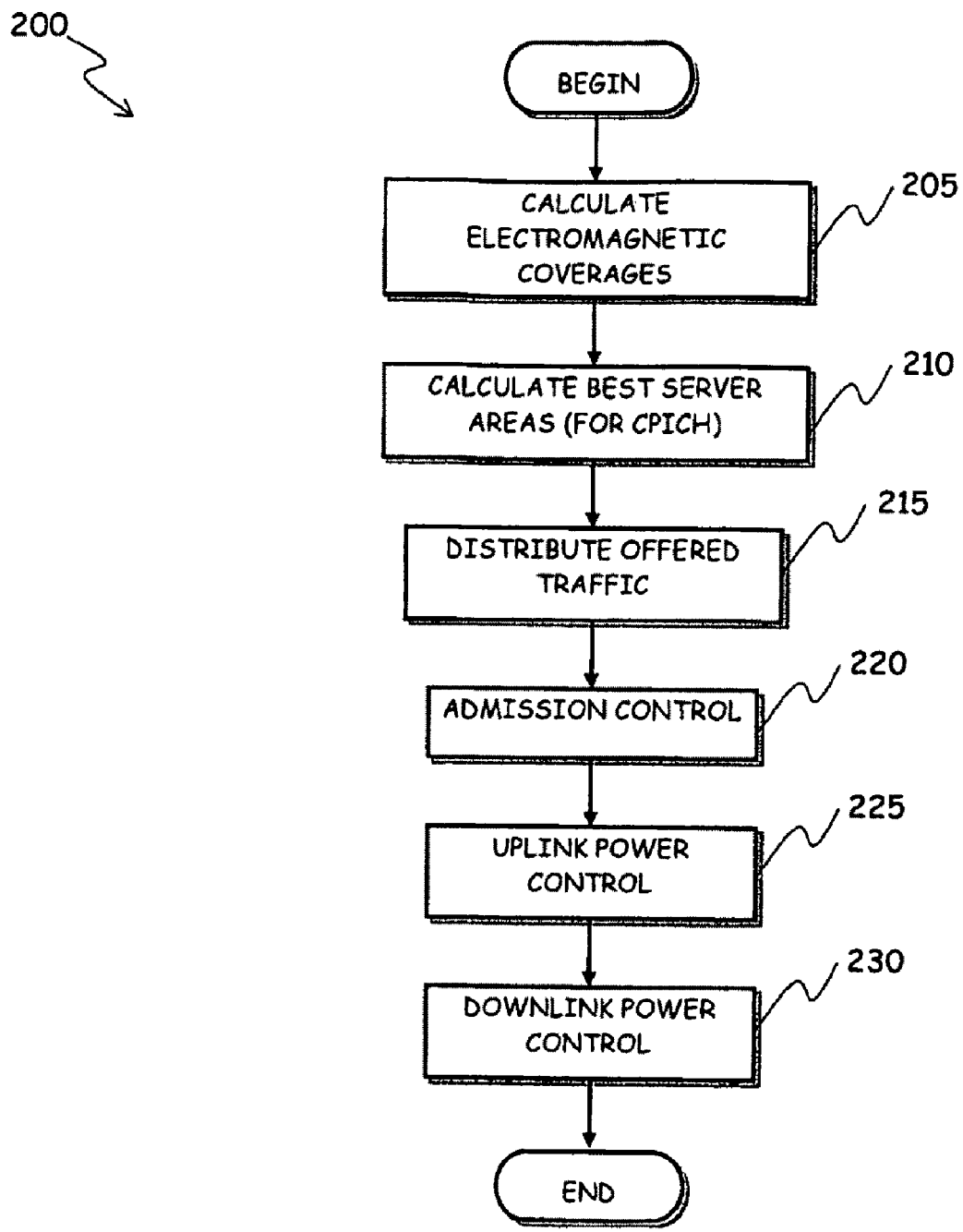
FIG. 2 is a schematic, simplified flowchart of the main steps of a network planning process.

The schematic flowchart of FIG. 2 shows the main phases or steps of a network planning process 200. It is pointed out that the various steps of the planning process, which will be hereinafter analyzed in detail, might be performed in a different chronological order compared to the one shown.

The area under planning is ideally subdivided into elementary areas or pixels px, for example square areas of 50 m by 50 m.

Firstly, the electromagnetic coverages of the various network cells are calculated (block 205), for a given, starting network configuration (number and position of BRSs/cells, radio equipment of each BRS, and the like). Calculating the electromagnetic coverages means in particular determining the sizes and the characteristics of each "coverage", i.e., the locus of pixels in which the radio-electric signal is received within a certain radius (for example, 80 Km) from the radiating antenna of the generic cell.

Then, the so-called "best server areas" of the various cells is calculated (block 210). As a result of this step, every pixel belonging to the area under planning is univocally assigned to a respective network cell, i.e. to a respective BRS, which is referred to as the "best server cell" of that pixel. In particular, the best server cell of a generic pixel is the cell whose BRS radiates in that pixel a signal having a power level (the RSCP), as far as the Common PIlot CHannel (CPICH) is considered, being the highest compared to the power level of the signals radiated in that pixel by every other cell that belongs to the area under planning.

The distribution of the traffic offered to the network, for the different network services, across the area under planning is then calculated (block 215); as a result, an estimation is obtained of the traffic offered by each network service (e.g., telephony, fax, video-telephony, Internet access, streaming and so on) to each pixel.

A phase referred to as "admission control" follows (block 220). In this phase, based on the previously calculated electromagnetic coverages (block 205), and exploiting the results of the offered traffic distribution (block 215), sub-areas within the best server areas of the various cells are determined: the computations involved by the subsequent steps of the planning process phases can be restricted to these sub-areas, instead of being performed over the whole best server areas. In particular, and merely by way of example, the admission control phase may be carried out as set forth in paragraph 3 of the document AC016/CSE/MRM/DR/P/091 entitled "STORMS Project Final Report", developed under the STORMS (Software Tools for the Optimization of Resources in Mobile Systems) project, promoted by the European Union. Essentially, a cell's loading factor η is determined, with value ranging from 0 to 1, calculated as the ratio of a target cell load, i.e. the load that it is expected that that cell will accept, to a cell's maximum load (also designated as "pole capacity"), wherein the maximum load is the load that cannot be exceeded not to put the system under unstable conditions. The sub-area (i.e., the subset of pixels of the previously calculated best server area) thus determined ("admission control area") forms the computation domain of the following steps of the planning process.

In a subsequent phase, referred to as "uplink power control" (block 225), the network coverage in uplink is evaluated, for the given network configuration. In particular, the power required, for each traffic channel, to the UEs located in the admission control areas is calculated. For every pixel of the admission control areas, and for each network service, the cell is determined which requires the lowest transmission power by a hypothetic UE located on that pixel: the cell thus determined forms the serving cell of that pixel, as far as that network service is considered. If the lowest transmission power requested to the UEs calculated in this phase exceeds the maximum power deliverable by the generic UE (a parameter which is predetermined and forms one of the inputs to the planning process), the pixel under consideration is put in outage for insufficient power in uplink. The set of pixels for which the generic cell is the serving cell in respect of the generic network service forms the "cell uplink service area" of that cell for that service in uplink. The set of cell service areas in uplink for the various cells of the area under planning in respect of the considered network service forms the "uplink network service area" for that service. The set of pixels put in outage for insufficient power in uplink, for the generic network service, forms the "service outage area" in uplink for that service.

In other words, in the uplink power control phase, a plurality of sets of maps is determined, one set of maps for each network service; the generic set of maps includes in turn a number of maps equal to the number of cells of the area under planning: each map is formed by those pixels for which the respective cell (the serving cell) requires the lowest power in the uplink. Starting from said plurality of sets of maps, a new plurality of sets of maps is determined, by eliminating those pixels for which the transmission power in uplink exceeds the predetermined maximum transmission power of the generic UE, for the generic network service.

In the following phase of the planning process, referred to as the "downlink power control" (block 230), an evaluation of the downlink coverage by the network portion under planning is performed, so as to find out whether, for the given network configuration based on which the uplink coverage has been evaluated, the downlink is a limiting factor.

More particularly, for each cell belonging to the area under planning, the cell uplink service area, calculated in the uplink power control step, is considered. For each pixel belonging to the cell uplink service area, and for every network service, the power per traffic channel required to the considered cell is calculated (thus, the power necessary for supporting the connection with the generic UE located on that pixel and exploiting the considered network service is calculated), assuming that the maximum bit-rate of the service is to be guaranteed. In order for a generic pixel to be considered "served" by the network, the power per traffic channel required to the cell should not exceed the maximum power deliverable by the cell per traffic channel; if, for the generic pixel, the calculated power exceeds the maximum power deliverable per traffic channel by that cell for the considered network service, that pixel is put in outage for insufficient power in downlink. The set of pixels, belonging to the generic cell uplink service area for the generic service and not being in outage for insufficient power in downlink forms the "cell global service area" of the cell for that service. The union of the cell global service areas of the various cells of the area under planning, for the various network services, forms the "network global service area". The set of pixels in outage for insufficient power in downlink, for the generic network service, forms the "downlink outage area" of that service.

The downlink power control phase also encompasses a check of the cell capacity for the total power delivered in downlink. The overall power required to the generic cell (the total power that has to be delivered by the cell for all the traffic channels, for all the network services, plus the power delivered by the cell for the common channels—CPICH, SCH and the like) is then compared to a maximum power deliverable by that cell. If the overall required power does not exceed the maximum deliverable power, the generic cell passes the capacity check. The cell global service area, for the generic network service, will thus include all those pixels for which:

a) the required power per traffic channel in uplink does not exceed the maximum power deliverable by the generic UE, for the considered network service; and b) the required power per traffic channel in downlink does not exceed the maximum power deliverable by that cell per traffic channel, for the considered network service.

If instead the overall required power exceeds the cell's maximum deliverable power, the capacity check is not passed: the cell is in capacity congestion. The cell global service area will thus include a sub-set of the pixels satisfying the conditions a) and b) above, such sub-set being formed by the pixels that satisfy the further condition:

c) the total power delivered to all the UEs located on the pixels of the cell global service area, for all the network services, is equal to the maximum power deliverable by that cell.

Such a subset of pixels may for example be determined by sorting all the pixels satisfying the conditions a) and b) above by increasing attenuation values, and selecting, among the sorted list of pixels thus obtained, starting from the pixel having the lowest attenuation, the first k pixels in the list for which the condition c) is satisfied.

Also, if cells in capacity congestion are found, it might be necessary to reconsider the assumptions made for the inputs to the planning process, for example the distribution of the offered traffic, and the location of the cells in the area under planning.

As discussed in the foregoing, prior art network planning methods do not make any distinction between GSs and NGSs in the uplink power control phase. In other words, in order to determine the uplink service area of a generic network service, the service is implicitly treated as a GS, even if it actually is an NGS, taking as the service bit-rate the maximum bit-rate for that service.

In the network's real operation, however, the down-scalability of the bit-rate of the NGSs may be used to implement so-called "soft-congestion control" policies, based on Radio Resource Management (RRM) algorithms such as those outlined in the document TR 25922 6.0.1 (2004-04) entitled "$3^{rd}$ Generation Partnership Project, Technical Specification Group Radio Access Network, Radio resource management strategies (Release 6)".

In particular, and just by way of example, in order to implement the RRM algorithm, two or more power fraction thresholds may be set, expressed as percentages of the maximum power deliverable by the generic UE using the generic NGS; as long as the instantaneous power requested to the UE remains below the lowest power fraction threshold, the NGSs are offered at their maximum bit-rate; if the lowest threshold is exceeded, the bit-rate of one or more NGSs is reduced; if the instantaneous power requested to the UE exceeds the next power fraction threshold, the bit-rate of one or more NGSs is reduced further, and so on.

According to an embodiment of the present invention, in the uplink power control phase account is taken of the fact that the generic network service is either a GS or an NGS: in the former case, the calculations to determine the uplink service area are performed as conventionally, considering the unique, fixed bit-rate of the considered GS; in the latter case, in order to determine the uplink service area account is taken of the different possible bit-rates at which the service can be accessed, and, in case of congestion situations, the uplink service area for that NGS may be formed by two or more sub-areas, each one calculated in respect of one the admissible bit-rates of the NGS: the generic sub-area represents the set of pixels in which the considered NGS can be accessed by the UEs located in the pixel at the corresponding bit rate.

Figure 3A:
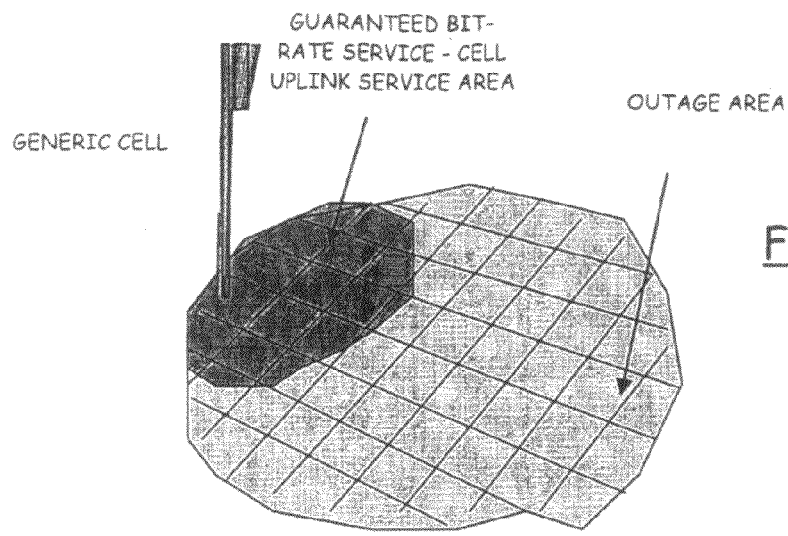
FIGS. 3A and 3B schematically depict a generic network cell of the network being planned, with associated network service areas for a generic, non-guaranteed bit-rate network service, as calculated according to the prior art and, respectively, by a method according to an embodiment of the present invention.

For example, referring FIG. 3A, in the case of a GS the cell uplink service area is unique, and is formed by the set of pixels for which the calculated power required to the UEs does not exceed the maximum power; the remaining pixels are put in the service outage area. According to the prior art, FIG. 3A could as well refer to an NGS.

Figure 3B:
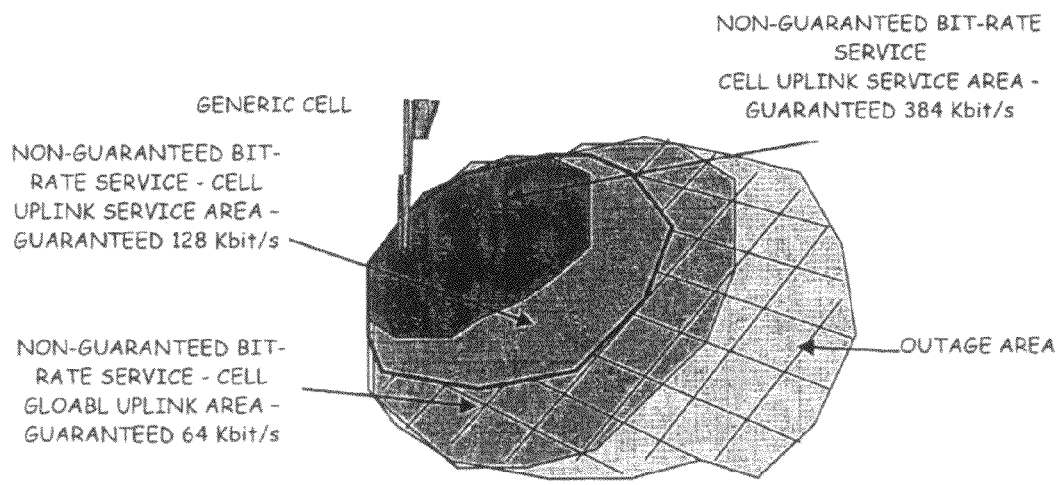

According to an embodiment of the present invention, and considering FIG. 3B, an NGS is for example considered that can be provisioned (in uplink) at three different bit-rates, namely 384 Kbit/s, 128 Kbit/s and 64 Kbit/s; according to an embodiment of the present invention, three sub-areas can be determined for this service in the uplink power control phase: a first sub-area made up of the pixels in which the UEs can access the service at the maximum bit-rate, a second sub-area, wider than and possibly including the first sub-area, made up of the pixels in which the UEs can enjoy the service at the scaled-down bit-rate of 128 Kbit/s, and a third sub-area, wider than and possibly including the first and the second sub-areas, made up of the pixels in which the UEs can enjoy the service at the further reduced bit-rate of 64 Kbit/s. It can be appreciated that the service outage area is thus reduced compared to the case in which only the maximum bit-rate is considered: the cell uplink service area is thus widened, and the results of the planning process are improved, because the uplink service areas are sized in a less conservative, more true-to-reality way.

Hereinafter, a method for performing the uplink power control (block 225 of FIG. 2), according to an embodiment of the present invention, will be described in detail, with the help of the simplified flowchart 400 of FIG. 4.

Preliminary, a list of parameters is provided hereinbelow, with corresponding definitions, that will be referred to in the description of the uplink analysis method according to the invention embodiment herein described:

| Symbol | Definition |
| --- | --- |
| C | Set of cells included in the area under planning. |
| $S_j^{GS}$ | Set of GSs supported by the generic cell Cj. |

-continued

| Symbol | Definition |
|---|---|
| $S_j^{NGS}$ | Set of NGSs supported by the generic cell Cj. |
| $Nds_s$ | Maximum number of bit-rate values in down-switch supported by the generic NGS s in uplink. |
| (m, n) | Coordinates of the generic pixel in the area under planning. |
| $\Omega_j^s(r)$ | Set of pixels (m, n) belonging to the cell service area in uplink of the cell $C_j$, for the generic NGS s and in respect of the $r^{th}$ level of bit-rate value down-switch. |
| $Z_j^s$ | Set of pixels (m, n) belonging to the cell service area in uplink of the cell $C_j$, for the generic GS s. |
| $r_j^s$ | Level of bit-rate value down-switch for the generic NGS s in respect of the generic cell $C_j$ (values ranging from 1 to $Nds_s$). |
| $SNR_s^{GS}$ | Target signal-to-noise ratio for the generic GS s in uplink. |
| $SNR_s^{NGS}(r)$ | Target signal-to-noise ratio for the generic NGS s in uplink, in respect of the down-switch level (i.e., the maximum bit-rate) r (r ranging from 1 to $Nds_s$). |
| $N_{THR}^{CONG}(s)$ | Number of power fraction thresholds (thresholds set as fractions of the maximum power deliverable by the generic UE using the service s. |
| $Thr_{CONG}(r, s)$ | Maximum deliverable power threshold for the UE for the bit-rate level r (r ranging from 1 to $Nds_s$) (the power thresholds are sorted in increasing order). |
| $RSCP_{(m, n)}^j$ | Power received (in dBm) on the Common Pilot CHannel (CPICH) of the generic cell $C_j$, by the generic UE located on the pixel (m, n). |
| $RSCP_{(m, n)}^{BEST}$ | Power received (in dBm) on the Common Pilot CHannel (CPICH) of the best server cell for the pixel (m, n) by the generic UE located on the pixel (m, n). It is: $RSCP_{(m, n)}^{BEST} = RSCP_{(m, n)}^k$ $RSCP_{(m, n)}^k \geq RSCP_{(m, n)}^j$ $\forall j \neq k$ |
| $\beta_j$ | CPICH best-server area for the generic cell Cj, made up by all the pixels (m, n) for which it is $RSCP_{(m, n)}^{BEST} = RSCP_{(m, n)}^k$. |
| $\Phi_s$ | Set of pixels belonging to the initial computation domain for the power control algorithm in uplink, for the generic service s. |
| $\Psi_s$ | Set of pixels (m, n) in outage for the generic network service s. |
| $\omega_j^s$ | Set of pixels (m, n) in outage for the generic network service s, in the CPICH best-server area for the generic cell Cj. |
| $P_{(m, n), s}^j$ | Power required, per dedicated traffic channel (DCH), by the generic cell $C_j$, to the UEs present on the pixel (m, n) and using the generic network service s for guaranteeing the target uplink SNR. |
| $P_{(m, n), s}^{DCH}$ | Transmitted power, per dedicated traffic channel (DCH), by the UEs located on the pixel (m, n), and using the generic network service s. |
| $P_{DCH}^{Max}(s)$ | Maximum power deliverable on the dedicated traffic channel (DCH) for the service s by the generic UE. |
| $P_{DCH}^{Min}(s)$ | Minimum power deliverable on the dedicated traffic channel (DCH) for the service s by the generic UE. |
| $RTWP_j$ | Total power received, over the whole useful frequency band, by the generic cell $C_j$. |
| MD | Macrodiversity threshold (in dB). |
| $\Delta_{(m, n)}$ | Set of candidate cells for controlling the power of the generic UE located on the generic pixel (m, n). |
| $P_{Noise}$ | Thermal noise power. |
| $Loss_{(m, n), j}$ | Link attenuation from the generic pixel (m, n) to the generic cell $C_j$. |
| $\overline{\chi}_s$ | Service Activity Factor (SAF) of the generic service s in uplink, a statistical parameter indicating the ratio of the average transmission time in uplink to the total connection time in respect of the service s. |
| $T_{(m, n), s}$ | Number of UEs present on the generic pixel (m, n) in respect of the generic network service s. |

Firstly, an initialization procedure is performed in which several of the above-listed parameters are initialized to prescribed initialization values.

In particular (block 405), for each cell Cj belonging to the set C of cells of the area under planning, and for each network service s belonging to the corresponding set $S_j^{NGS}$ of NGSs supported by that cell Cj, the parameter $r_j^s$ expressing the bit-rate down-switch level is initialized, for example to 1:

$$r_j^s = 1.$$

In this phase, also the power threshold $Thr_{CONG}(r,s)$ is initialized, to the value corresponding to the maximum bit-rate for that service. For example, assuming an NGS having three admissible bit-rates, like 384 Kbit/s, 128 Kbit/s and 64 Kbit/s, three power respective threshold can be defined, respectively equal to, for example, 50%, 60% and 100% of the maximum deliverable power $P_{DCH}^{Max}(S)$.

Then, the service areas and the outage areas are initialized (block 410). In particular, for each cell Cj, and for each GS and NGS supported by that cell (i.e., for each services $s \in S_j^{NGS} \cap S_j^{GS}$) the set $\Omega_j^s(r)$ (i.e., the set of pixels (m,n) belonging to the uplink service area of the cell $C_j$, for the generic NGS s and in respect of the $r^{th}$—the first, in this phase—level of bit-rate value down-switch) and the set $Z_j^s$ (i.e., the set of pixels (m,n) belonging to the uplink service area of the cell $C_j$ for the generic GS s) are initialized to a starting area, for example the area calculated in the admission control phase, or to an area equal to the intersection $\beta_j \cap \Phi_s$; in the following, for the sake of simplicity, it is assumed that the starting area is $\beta_j$ (i.e., the CPICH best-server area; in other words, it is for simplicity assumed that the admission control area is equal to the union of the areas $\beta_j$):

$$\Omega_j^s(r_j^s) = \forall (m,n) \in \beta_j$$

$$Z_j^s = \forall (m,n) \in \beta_j$$

Additionally, for each cell Cj and for each network service $s \in S_j^{NGS} \cap S_j^{GS}$ the set $\omega_j^s$ (i.e., the set of pixels (m,n) in outage for the generic network service s, in the CPICH best-server area for the generic cell Cj) is initialized to the void set. Consequently, for each service $s \in S_j^{NGS} \cap S_j^{GS}$, the set $\Psi_s$ of the pixels in outage for that network service s is initially set void.

The transmission powers requested to the hypothetic UEs located on the pixels of the area under planning are then initialized (block 415). In particular, for each hypothetic UE on a certain pixel (m,n), the required transmission power $p_{(m,n),s}^{DCH}$ in respect of each network service s (either GS and NGS) is initialized, for example to zero:

$$p_{(m,n),s}^{DCH} = 0 \forall s \in S_j^{NGS} \cap S_j^{GS} \text{ and } \forall (m,n) \in \Phi_s.$$

It is pointed out that, in alternative embodiments of the invention, the transmission power $p_{(m,n),s}^{DCH}$ required to the UEs might as well be initialized to a value different than 0, for example to a value dependent on, for example proportional to the initial service area, which, in the example herein considered, is the best server (CPICH) area, or to a value dependent on, for example proportional to the traffic offered to said pixel (m,n).

A loop is then entered (blocks 420, 425 and 430).

The total power $RTWP_j$ received in uplink by each cell $C_j$ of the area under planning is calculated (block 420). In particular, the total power is calculated as follows:

$$RTWP_j = \sum_{s \in S_j^{NGS} \cup S_j^{GS}} \sum_{(m,n) \in \Phi_s - \Psi_s} \frac{p_{(m,n),s}^{DCH} \cdot T_{(m,n),s} \cdot \overline{X}_s}{Loss_{(m,n),j}} + P_{Noise}.$$

Based on the calculated total power $RTWP_j$ received by each cell Cj, the values of the transmission powers required to the UEs are updated (block 425), for every pixel (m,n) of the area under planning, and for every network service s. This calculation also involves an update of the cell service areas, for each network service. The goal of these calculations is to determine, for each pixel (m,n) of the area under planning and for each network service s, the cell that requires the minimum transmission power to a hypothetic UE located on that pixel and exploiting that service, and to determine the amount of such minimum transmission power. The cells that can control the power of an UE located on the pixel (m,n) are all those cells Cj for which the corresponding $RSCP_{(m,n)}^j$ value is at most MD dB below the $RSCP_{(m,n)}^{BEST}$ value, i.e. all those cells for which the respective CPICH is received, at the considered pixel (m,n), with a power that, compared to the power at which the CPICH of the best server cell is received, is in the range $[RSCP_{(m,n)}^{BEST} - MD; RSCP_{(m,n)}^{BEST}]$.

The set $\Delta_{(m,n)}$ of the candidate cells is thus built in the following way:

$$\Delta_{(m,n)} = \forall Cj : RSCP_{(m,n)}^j \geq RSCP_{(m,n)}^{BEST} - MD.$$

For each pixel (m,n) of the area under planning, for each cell $C_j$ belonging to the set $\Delta_{(m,n)}$, and for each network service $s \in S_j^{GS}$ (i.e., for each GS), the transmission power required to the hypothetic UE located on that pixel by the cell $C_j$ for guaranteeing the target SNR are calculated as follows:

$$SNR_s^{GS} = \frac{p_{(m,n),s}^j}{Loss_{(m,n),j}} \cdot \frac{1}{\left(RTWP_j - \frac{p_{(m,n),s}^j}{Loss_{(m,n),j}}\right)} \Rightarrow p_{(m,n),s}^j =$$

$$RTWP_j \cdot \frac{SNR_s^{GS}}{1 + SNR_s^{GS}} \cdot Loss_{(m,n),j}$$

Similarly, for each pixel (m,n) of the area under planning, for each cell $C_j$ belonging to the set $\Delta_{(m,n)}$, and for each network service $s \in S_j^{NGS}$ (i.e., for each NGS), the transmission power required to the hypothetic UE located on that pixel by the cell $C_j$ for guaranteeing the target SNR are calculated as follows:

$$SNR_s^{NGS}(r_j^s) = \frac{p_{(m,n),s}^j}{Loss_{(m,n),j}} \cdot \frac{1}{\left(RTWP_j - \frac{p_{(m,n),s}^j}{Loss_{(m,n),j}}\right)} \Rightarrow p_{(m,n),s}^j =$$

$$RTWP_j \cdot \frac{SNR_s^{NGS}(r_j^s)}{1 + SNR_s^{NGS}(r_j^s)} \cdot Loss_{(m,n),j}$$

The calculated UE transmission power has to fall within predetermined maximum/minimum ratings established for the generic UE, and which to be considered as inputs to the planning process, whereby:

$$p_{(m,n),s}^j = \begin{cases} RTWP_j \cdot \frac{SNR_s}{1+SNR_s} \cdot Loss_{(m,n),j} & \text{if } RTWP_j \cdot \frac{SNR_s}{1+SNR_s} \cdot Loss_{(m,n),j} \geq p_{DCH}^{Min}(s) \\ p_{DCH}^{Min}(s) & \text{if } RTWP_j \cdot \frac{SNR_s}{1+SNR_s} \cdot Loss_{(m,n),j} < p_{DCH}^{Min}(s) \end{cases}$$

wherein:

$$SNR_s = \begin{cases} SNR_s^{GS} & ses \in S_j^{GS} \\ SNR_s^{NGS}(r_j^s) & ses \in S_j^{NGS}. \end{cases}$$

Then, the cell is determined which, among all the cells belonging to the set $\Delta_{(m,n)}$, requires to the UEs the minimum transmission power: such a cell is taken, for the current iteration of the loop, as the serving cell of the pixel (m,n), as far as that generic network service is considered.

In this way, the set $\Omega_j^s(r_j^s)$ is calculated, for each cell Cj belonging to the set $\Delta_{(m,n)}$ and for each network service $s \in S_j^{NGS}$, in the following way:

$$\Omega_j^s(r_j^s) = \forall\, (m,n) \in \Phi_s : \begin{cases} p_{(m,n),s}^j = \text{MIN}[p_{(m,n),s}^j]_{j \in \Delta_{(m,n)}}^{s \in S_j^{NGS}} \\ \text{and} \\ p_{(m,n),s}^j \leq p_{DCH}^{Max}(s) * \dfrac{Thr_{CONG}(r_j^s, s)}{100} \end{cases}$$

It is pointed out that, in respect of NGSs, the comparison is not made with the maximum requested transmission power $P_{DCH}^{Max}(s)$ for that service, but with the maximum requested transmission power properly scaled by the suitable power threshold $Thr_{CONG}(r,s)$.

In a similar way, the set $Z_j^s$ is calculated, for each cell Cj belonging to the set $\Delta_{(m,n)}$ and for each network service $s \in S_j^{GS}$, in the following way:

$$Z_j^s = \forall\, (m,n) \in \Phi_s : \begin{cases} p_{(m,n),s}^j = \text{MIN}[p_{(m,n),s}^j]_{j \in \Delta_{(m,n)}}^{s \in S_j^{GS}} \\ \text{and} \\ p_{(m,n),s}^j \leq p_{DCH}^{Max}(s) \end{cases}$$

The transmission power required to the generic UE located on the pixel (m,n) by the serving cell of that pixel for the generic network service $s \in S_j^{GS} \cap S_j^{NGS}$ (at the current iteration of the loop) is thus calculated as follows:

$$p_{(m,n),s}^{DCH} = \text{MIN}[p_{(m,n),s}^j]_{j \in \Delta_{(m,n)}}$$

The outage areas, for the generic service s, at the generic current iteration of the loop, are calculated as follows:

$$\omega_j^s = \begin{cases} \forall\, (m,n) \in \beta_j : (m,n) \notin \Omega_j^s(r_j^s) & s \in S_j^{NGS} \\ \forall\, (m,n) \in \beta_j : (m,n) \notin Z_j^s & s \in S_j^{GS} \end{cases}$$

$$\Psi_s = \bigcup \omega_j^s \forall\, s \in S_j^{NGS} \cup S_j^{GS} \forall\, j$$

The loop is exited when convergence is reached, identified by the reaching of a stability condition, as far as the calculated UE required transmission powers are concerned (decision block 430). In particular, the condition of stability is determined setting a power tolerance Tol_UE_Pw (sufficiently small, for example corresponding to a value in dB from 0.5 dB to 1 dB): a stability condition is decreed to have been reached if, in passing from the generic, (k−1) iteration of the loop to the next, k iteration, it results that:

$$|p_{(m,n),s}^{DCH}(k) - p_{(m,n),s}^{DCH}(k-1)| \leq \text{Tol\_UE\_Pw}$$

$$\forall\, j \in C\, \forall\, (m,n) \in \Omega_j^s(r_j^s) \text{ if } s \in S_j^{NGS}$$

$$\forall\, j \in C\, \forall\, (m,n) \in Z_j^s \text{ if } s \in S_j^{GS}$$

for each pixel (m,n) of the area under planning, and for each service s, i.e. if the changes in the calculated required transmission powers are less than the set tolerance.

After exiting the loop (exit branch Y of decision block 430), the calculated service areas and outage areas, i.e. the sets $\Omega_j^s(r_j^s)$, $Z_j^s$ and $\omega_j^s$ are memorized (block 435). In particular, a set J is built, formed by all the cells Cj for which there exist a service $s \in S_j^{NGS}$ such that the set $\omega_j^s$ is not void; additionally, a set H is built, being a sub-set of the set J, wherein the set H includes all the cells Cj included in the set J for which there exist a service $s \in S_j^{NGS}$ having an associated outage area, and for which the current bit-rate down-switch level $r_j^s < Nds_s$, i.e., for which there is at least one bit-rate down-switch possibility left.

The set J is then evaluated (decision block 440): if the set J is void (exit branch N of decision block 440), i.e. if there are no pixels in outage for any NGS, the uplink power control phase ends. Differently, if there is at least one cell in the set J, i.e., if there are pixels in outage for one or more of the NGSs (exit branch Y of decision block 440), it is ascertained whether, for the NGS(s) having pixels in outage, the maximum bit-rate down-switch level has already been reached (decision block 445). In the affirmative case (exit branch Y of decision block 445), since there is no further possibility to down-switch the bit-rate for the NGS(s) having pixels in outage, the uplink power control procedure ends.

If instead, for the NGS(s) having pixels in outage (or for at least one of these NGSs) there remain bit-rate down-switch possibilities for the NGSs, i.e. if the set H is not void (exit branch N of decision block 445), the bit-rate down-switch level for that (those) NGS(s) (block 450):

$$r_j^s = r_j^s + 1 \, j \in H \omega_j^s \text{ not void},$$

the power threshold for the NGSs having been down-switched is updated accordingly, and the operations flow jumps back to the initialization phase (block 410). Steps 415 to 445 are then repeated for the new values of bit-rate and power threshold.

At the end of the uplink power control procedure, the sets $\Omega_j^s(r)$ and $Z_j^s$ contain the service areas for the NGSs, and, respectively, the service areas for the GSs; in particular, the service area for the generic NGS may be formed by two or more sub-areas, each one corresponding to a respective NGS bit-rate. The sets $\omega_j^s$ include instead the outage areas for the NGSs and the GSs, for each cell Cj.

Therefore, while for GSs only the maximum bit-rate is considered, the NGSs are initially treated as GSs at the maximum bit-rate, but the power threshold used for the transmission power test is the lowest (e.g., 50% of the UE maximum deliverable power). If for the generic NGS the calculated outage area is void, the uplink service area for that NGS corresponds to the area wherein that NGS is guaranteed at the maximum bit rate. If instead for the generic NGS a non-void outage area is obtained, the corresponding service area is memorized (this will be the area in which that NGS is guaranteed at the maximum bit rate), the bit-rate of that NGS is down-switched, the power threshold is accordingly increased (e.g., to 60%), and the procedure is reiterated. In particular, each time the bit-rate for at least one NGS is down-switched, and the power threshold used for the power test accordingly varied, the UE transmission powers, the service areas and the outage areas are recalculated; the service areas calculated for a given bit-rate value are the areas wherein the service is guaranteed at that bit rate.

Thus, as schematically shown in FIG. 3B, considering the generic cell, the service area for the generic NGS may be formed by two or more service sub-areas, for example a number of service sub-areas equal to the number of admissible bit-rates for that NGS; each of said sub-areas including pixels of the area under planning for which that cell requires the minimum transmission power to the UEs for supporting the considered NGS at a respective one of said admissible bit-rates.

Figure 5:
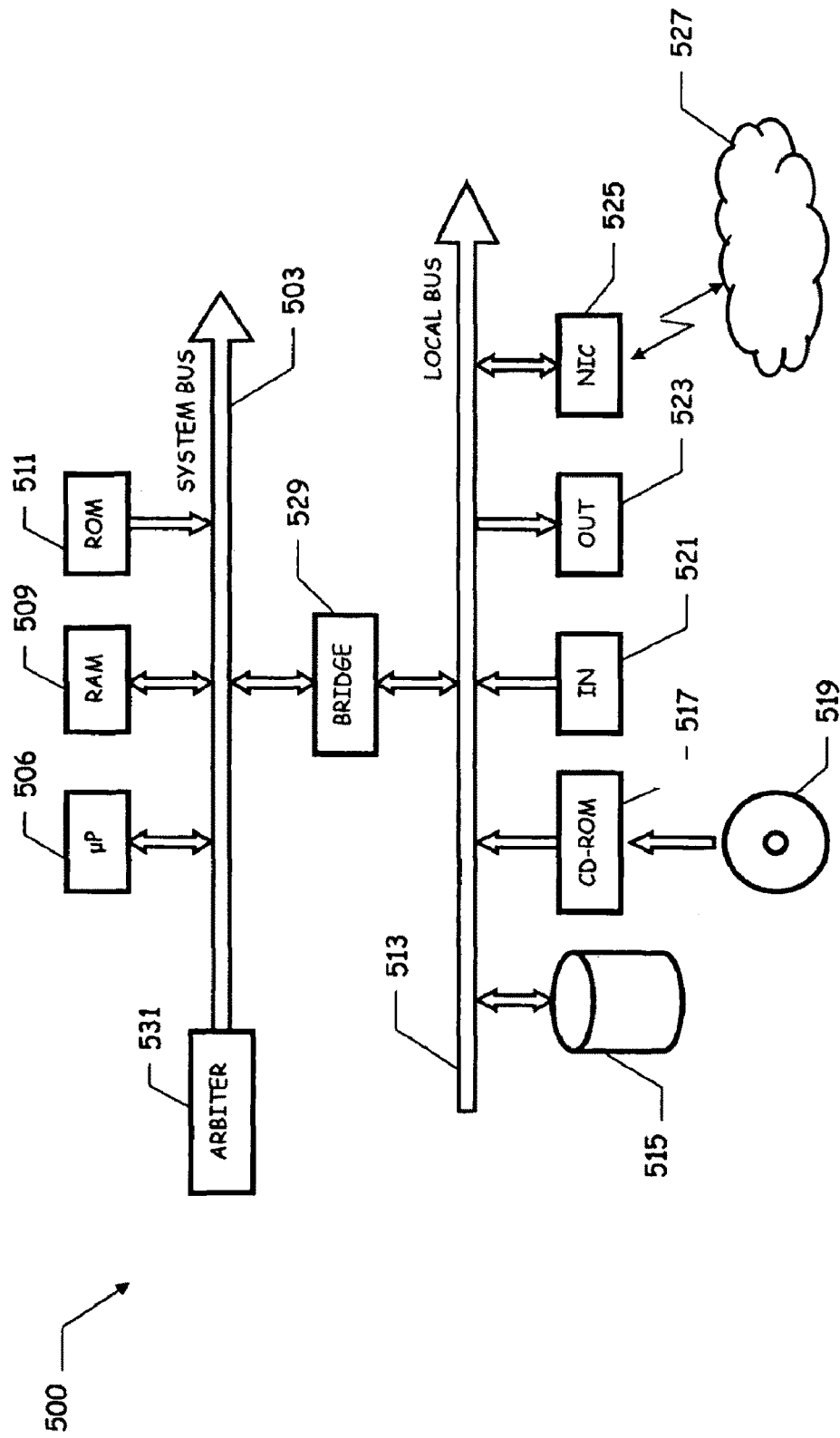
FIG. 5 schematically shows the main functional components of a data processing apparatus that, suitably programmed, is adapted to carry out the method according to an embodiment of the invention.

The above described method may be implemented in hardware, software, or partly in hardware and partly in software. In particular be carried out by a suitably programmed data processing apparatus or system like a personal computer or a workstation; the structure of a general-purpose computer 500 is schematically depicted in FIG. 5.

The computer 500 is comprised of several units that are connected in parallel to a system bus 503. In detail, one (possibly more) processor (μp) 506 controls the operation of the computer 500; a RAM 509 is directly used as a working memory by the microprocessor 506, and a ROM 511 stores the basic code for a bootstrap of the computer 500. Peripheral units are connected (by means of respective interfaces) to a local bus 513. Particularly, mass storage devices comprise a hard disk 515 and a CD-ROM/DVD-ROM drive 517 for reading CD-ROMs/DVD-ROMs 519. Moreover, the computer 500 typically includes input devices 521, for example a keyboard and a mouse, and output devices 523, such as a display device (monitor) and a printer. A Network Interface Card (NIC) 525 is used to connect the computer 500 to a network 527, e.g. a LAN. A bridge unit 529 interfaces the system bus 503 with the local bus 513. Each microprocessor 506 and the bridge unit 529 can operate as master agents requesting an access to the system bus 503 for transmitting information; an arbiter 531 manages the granting of the access to the system bus 503.

Figure 6:
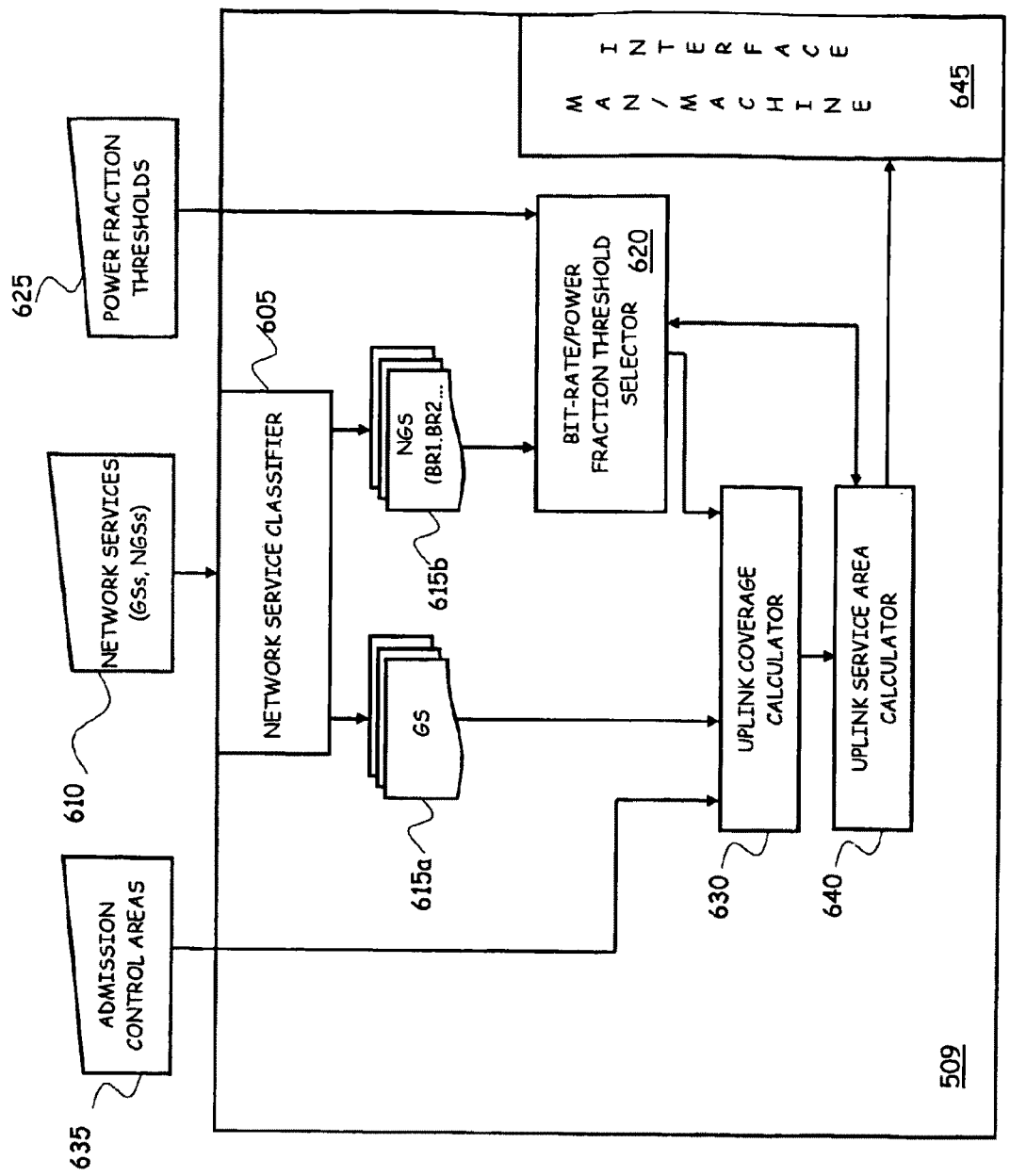
FIG. 6 schematically shows the main components of a program, when executed on the data processing apparatus of FIG. 5, implementing the method according to an embodiment of the present invention.

FIG. 6 is a pictorial representation of the main computer program components adapted to implement the above-described method are pictorially shown, according to an embodiment of the invention. In particular, FIG. 6 schematically depicts a partial content of the working memory 509 of the computer of FIG. 5. The information (programs and data) is typically stored on the hard disks and loaded (at least partially) into the working memory when the program is executed. The programs may be initially installed onto the hard disks from, e.g., CD-ROMs or DVD-ROMs, or they may be downloaded from, e.g., a distribution server machine through the data communications network 527.

A network service classifier module 605 receives in input a list 610 of network services that the network being planned is intended to offer to the users; the network services are properly described, particularly in order to allow the network service classifier module 605 distinguish among GSs and NGSs; the description of the GSs includes the fixed bit-rates to be guaranteed for those services, whereas the description of the NGSs includes a list of the different admissible bit-rates at which the services can be offered. The network service classifier module 605 classifies the network services of the list 610 into a list of GSs 615a, and a list of NGSs 615b.

A bit-rate/power fraction threshold selector module 620 allows selecting one among the possible admissible bit-rates for the NGSs, and one in a list of admissible power fraction thresholds 625 (e.g., 50%, 60%, 100% of the maximum power deliverable by the cells).

An uplink coverage calculator module 630 receives cell admission control areas 635, calculated for example in the previous phase of admission control of the planning process, the GSs, and, from the bit-rate/power fraction threshold selector the NGSs, with the selected respective bit-rates, and the power fraction threshold(s). The uplink coverage calculator module 630 calculates the uplink coverage, particularly it determines the power required to each UE for accessing the specified network services.

An uplink network service outage area/service area calculator module 640 calculates the network service/outage areas, for each service, and, for the NGSs, for the different bit-rates. The results of the module 640 is used to drive the bit-rate/power fraction threshold selector module 620, so as to modify the bit-rate of one or more NGSs, and the power fraction threshold(s), in case the services have an outage area.

A man/machine interface module 645, e.g. a graphical user interface, allows displaying the results of the uplink power control algorithm.

In the invention embodiment described in the foregoing, the calculation domains for the uplink power control phase (block 225) were determined in the preceding admission control phase (block 220); this means that, for example, in the initialization phase of the service areas and the outage areas (block 410), the set $\Omega_j^s(r)$ and the set $Z_j^s$ are initialized to the areas calculated in the admission control phase.

From one hand, the admission control phase before the uplink power control phase is useful to avoid that, in the uplink power control phase, the service area calculated for the generic network service is too broad, with the risk of overloading the cell from the interference viewpoint. Indeed, one of the goals of the UMTS network planning is to limit the cell load in uplink, because too high average cell loads may in the practice cause instability conditions that worsen the quality of service experienced by the users.

However, the Applicant observes that in such a way the results produced by the uplink power control phase depend on the assumptions made in the preliminary, admission control phase. In particular, the Applicant observes that, in the admission control phase, the calculation areas are determined on the basis of simplifying assumptions for the interference experienced and caused by the cells of the area under planning, particularly by setting a maximum admissible interference value for the generic cell, and calculating the area in which the service can be guaranteed while respecting the requirement on the maximum admissible interference value. The maximum admissible interference value for a generic cell is set by setting an upper limit to the cell load in uplink (the load factor η). The assumption concerning the interference within a cell is made by setting a priori a value (in general varying from cell to cell), of an inter-cell interference factor, defined as the ratio of the overall power received by a generic cell from links not directly controlled in power by the cell (inter-cell interference) to the overall power received by the cell from users that are directly controlled in power by the cell, and thus belonging to the cell uplink service area for the service considered (intra-cell interference).

The value of the interference factor is closely related to the transmission power of the users in uplink; this information is however not known a priori, being determined by the following uplink power control phase. Thus, in order to perform the admission control phase before the uplink power control phase, an assumption needs to be made for the value of the interference factor that cannot take into sufficiently accurate account the real interference in the area under planning. As a consequence, the calculation areas thus determined, on which the following uplink power control phase is based, may be not sufficiently close to the real interferential conditions, which are not known until after the uplink power control phase, and the global service areas that are calculated may be unrealistic and cause network malfunctioning.

Figure 7:
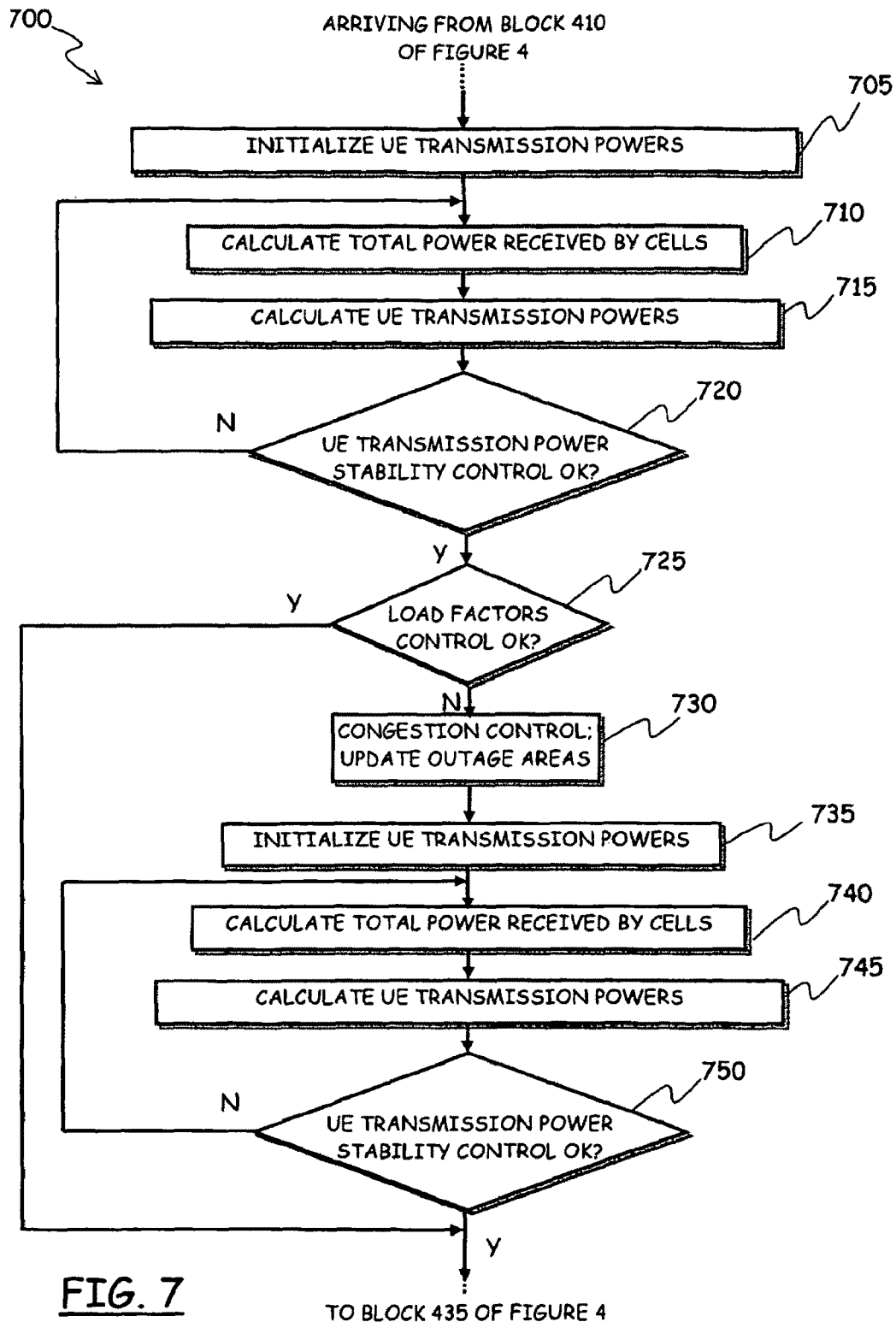
FIG. 7 is a simplified flowchart of some steps of a method according to an alternative embodiment of the present invention.

In the following, an alternative invention embodiment is described, allowing to avoid performing the admission power control phase before the uplink power control phase. The description is carried out referring to the simplified flowchart of FIG. 7.

After the calculation of the CPICH best server areas of the various cells of the area under planning (block 210 of FIG. 2), without performing any preliminary admission control, the uplink power control phase (block 225) is entered.

As in the previous embodiment, an initialization phase is performed (blocks 405 and 410), wherein, for each cell Cj belonging to the set C of cells of the area under planning, and for each network service s belonging to the corresponding set $S_j^{NGS}$ of NGSs supported by that cell Cj, the parameter $r_j^s$ expressing the bit-rate down-switch level is initialized, for example to 1, the power threshold $Thr_{CONG}(r,s)$ is initialized, to the value corresponding to the maximum bit-rate for that service, an the service areas and the outage areas are initialized. Differently from the previous embodiment, for each cell $C_j$, and for each GS and NGS supported by that cell (i.e., for each service $s \in S_j^{NGS} \cap S_j^{GS}$) the set $\Omega_j^s(r)$ (i.e., the set of pixels (m,n) belonging to the uplink service area of the cell $C_j$, for the generic NGS s and in respect of the $r^{th}$—the first, in this phase—level of bit-rate value down-switch) and the set $Z_j^s$ (i.e., the set of pixels (m,n) belonging to the uplink service area of the cell $C_j$ for the generic GS s) are initialized to $\beta_j$, i.e., to the CPICH best-server area, calculated in the phase 210:

$$\Omega_j^s(r_j^s) = \forall (m,n) \in \beta_j$$

$$Z_j^s = \forall (m,n) \in \beta_j.$$

Additionally, as in the previous embodiment, for each cell $C_j$ and for each network service $s \in S_j^{NGS} \cap S_j^{GS}$, the set $\omega_j^s$ (i.e., the set of pixels (m,n) in outage for the generic network service s, in the CPICH best-server area for the generic cell $C_j$) is initialized to the void set. Consequently, for each service $s \in S_j^{NGS} \cap S_j^{GS}$, the set $\Psi_s$ of the pixels in outage for that network service s is initially set void.

The transmission powers $p_{(m,n),s}^{DCH}$ requested to the hypothetic UEs located on the pixels of the area under planning are then initialized (block 705). In particular, as in the previous embodiment, the required transmission power may for example be initialized to zero.

A loop is then entered directed to controlling the uplink power requested to the UEs. In particular, at each iteration of the loop, the total power $RTWP_j$ received in uplink by the generic cell $C_j$, over the whole useful frequency band, is calculated (block 710), as follows:

$$RTWP_j = \sum_{s \in S_j^{NGS} \cup S_j^{GS}} \sum_{(m,n) \in \Phi_s - \Psi_s} \frac{p_{(m,n),s}^{DCH} \cdot T_{(m,n),s} \cdot \overline{X}_s}{Loss_{(m,n),j}} + P_{Noise}.$$

Based on the calculated total received power $RTWP_j$, new values of the UE required transmission powers are updated (block 715), for every pixel (m,n) of the area under planning, and for every network service s. As explained in connection with the previous embodiment, this calculation also involves a calculation of the cell service areas, for each network service, and their is to determine, for each pixel (m,n) of the area under planning and each network service s, the cell that requires the minimum transmission power to a hypothetic UE located on that pixel and exploiting that service, and to determine the amount of such minimum transmission power. The cells that can control the power of an UE located on the pixel (m,n) are all those cells $C_j$ for which the corresponding $RSCP_{(m,n)}^j$ value is at most MD dB below the $RSCP_{(m,n)}^{BEST}$ value, and the candidate set $\Delta_{(m,n)}$ is built accordingly.

For each pixel (m,n) of the area under planning, for each cell $C_j$ belonging to the set $\Delta_{(m,n)}$, and for each network service $s \in S_j$, the transmission powers required to the hypothetic UEs located on that pixel by the cell $C_j$ for guaranteeing the target SNR are calculated as described in connection with the previous embodiment. For each cell Cj belonging to the candidate set $\Delta_{(m,n)}$ the set $\Omega_j^s(r_j^s)$ and the set $Z_j^s$ are calculated, for each network service $s \in S_j^{NGS}$, and, respectively, $s \in S_j^{GS}$, as described in connection with the previous embodiment. In the calculation of the set $\Omega_j^s(r_j^s)$, the maximum requested transmission power used for the comparison is properly scaled by the applicable power threshold, corresponding to the current bit-rate down-switch level of the NGS. The outage areas, for the generic service s, at the generic current iteration of the loop, are calculated as described in connection with the previous embodiment.

The loop is exited when convergence is reached, identified by the reaching of a stability condition, as far as the calculated UE transmission powers are concerned (decision block 720). In particular, the condition of stability is determined setting a power tolerance, like the tolerance Tol_UE_Pw already mentioned in connection with the previous embodiment: a stability condition is decreed to have been reached if, in passing from the generic, (k−1) iteration to the next, k iteration of the loop, it results that:

$$|p_{(m,n),s}^{DCH}(k)_{dB} - p_{(m,n),s}^{DCH}(k-1)_{dB}| \leq Tol\_UE\_Pw$$

for each pixel (m,n) of the area under planning, and for each service s, i.e. if the changes in the calculated required powers are less than the set tolerance.

After exiting the loop, a control is performed to ascertain whether all the load factors in uplink are, at most, equal to a predetermined maximum load factor (block 725). Defined the load factor in uplink for the generic cell $C_j$ as:

$$\eta_j = 1 - \frac{P_{Noise}}{RTWP_j},$$

the test is passed if, for every cell $C_j$ of the area under planning, it is:

$$\eta_j \leq \eta_{MAX}.$$

wherein $\eta_{MAX}$ is a predefined maximum load factor value. If the test is passed, the procedure continues with block 435 of FIG. 4. If instead the test on the load factors is not passed, a congestion control is performed (block 730). A set $\theta$ is built, formed by all the cells of the area under planning for which the test is not passed, i.e. for which it is:

$$\eta_j > \eta_{MAX} \text{ and } \Omega_j^s \neq Void,$$

i.e. all the cells experiencing a calculated load factor that exceeds the predetermined maximum load factor, and which have a non-void service area.

For each cell Cj belonging to the set $\theta$, a respective uplink congestion indicator Cong-UL$_j$ is calculated as follows:

$$Cong\_UL_j = \xi(\eta_j, \eta_{MAX}),$$

wherein $\xi(\eta_j, \eta_{MAX})$ denotes a function of the load factors adapted to return a value in the range from 0 (excluded) to 100. In particular, and only by way of example (other forms for the function $\xi(\eta_j, \eta_{MAX})$ are possible), the function $\xi(\eta_j, \eta_{MAX})$ may take the following form:

$$\xi(\eta_j, \eta_{MAX}) = 100 \cdot \frac{\eta_j - \eta_{MAX}}{\eta_j}.$$

In other words, the uplink congestion indicator Cong-UL$_j$ is a number giving a measure of the congestion, in uplink, experienced by the generic cell $C_j$ and depending on the difference of the calculated load factor $\eta_j$ for that cell and the maximum load factor $\eta_{MAX}$.

For each cell $C_j$ belonging to the set $\theta$, and for each network service s belonging to the set of services intended to be provided, a decongestion function $\beta_{decong}$ is used; the decongestion function $\beta_{decong}$ is an operator applied to the uplink congestion indicator Cong_UL$_j$ of the generic cell for returning a value Cong_Tick$_s$, preferably ranging from 0 to 1, which expresses, in terms of a percentage, the number of pixels, among those being part of the current service area of the cell Cj in respect of the network service s, that are to be placed in service outage due to reasons of congestion in uplink. The decongestion function $\beta_{decong}$, $$\text{Cong\_Tick}_s = \beta_j^s(\text{Cong\_UL}_j)$$

may for example take a staircase-like shape, increasing from 0 to 1 as the value of the uplink congestion indicator Cong-$UL_j$ increases; just by way of example, the decongestion function $\beta$ may be described as follows:

$$\text{Cong-}UL_j \leq 10 \qquad \beta_{decong} = 0{,}01 \text{ (1\% of pixels)}$$
$$10 < \text{Cong-}UL_j \leq 20 \qquad \beta_{decong} = 0{,}02 \text{ (2\% of pixels)}$$
$$20 < \text{Cong-}UL_j \leq 50 \qquad \beta_{decong} = 0{,}1 \text{ (10\% of pixels)}$$
$$\text{Cong-}UL_j > 50 \qquad \beta_{decong} = 0{,}4 \text{ (40\% of pixels)}$$

For each cell $C_j$ belonging to the set $\theta$, a sorting function is built for each pixel (m,n):

$$\mathfrak{R}_{(m,n)}^j(\text{Loss}_{(m,n),j}, S_j^{GS} \cup S_j^{NGS}, T_{(m,n),s}),$$

the sorting function being, in the example herein considered, a function of the link loss $\text{Loss}_{(m,n),j}$, the network services supported by the generic cell $C_j$, and the number of UEs $T_{(m,n),j}$. The pixels (m,n) belonging to the current service areas $\Omega_j^s(r_j^s)$ and $Z_j^s$ of the cell $C_j$ in respect of the network service s are sorted, by applying the ordering function, in such a way that, taken two generic pixels (m1,n1) and (m2,n2), the pixel (m1,n1) precedes the pixel (m2,n2) if and only if:

$$\mathfrak{R}_{(m1,n1)}^j < \mathfrak{R}_{(m2,n2)}^j.$$

For example, the ordering function may be simply represented by the loss $\text{Loss}_{(m,n),j}$, in which case a generic pixel precedes another pixel provided that its loss is lower than the loss of said other pixel. More generally, the pixels may be sorted based on one or more parameter indicative of the respective contribution to the cell's uplink load factor, said parameter including for example the link loss, the traffic offered by the pixel, the type of traffic (e.g., emergency calls may be privileged over normal calls).

For each cell $C_j$ belonging to the set $\theta$, and for any NGS network service s supported by the cell, the dimension, in terms of number of pixels, of the cell current service areas for the cell $C_j$ is denoted $\text{Card}[\Omega_j^s]$. The service outage area $\Psi_s$, previously calculated, are updated by including a number of pixels equal to:

$$\lfloor \text{Cong\_Tick}_s \cdot \text{Card}[\Omega_j^s] \rfloor$$

taken from the set of pixels $\Omega_j^s$ forming the service area of the cell Cj in respect of the NGS network service s, starting from the first pixel according to the sorting produced by applying to the set $\Omega_j^s$ the ordering function $\mathfrak{R}_{(m,n)}^j$ defined above. Thus, the cell service area is restricted. More generally, the dimension, in terms of number of pixels, of the cell service area for the cell $C_j$ may be restricted in a way dependent on, particularly proportional to a difference between the calculated cell uplink load factor and the maximum load factor. Also, in case restricting the service area for NGS services is not sufficient, a similar procedure can be applied to the GS network services.

Then (block 735), for each pixel (m,n) belonging to the area under planning, and for each hypothetic UE located on that pixel, the transmission power required to the UE for the each network service is again initialized, for example at zero.

Afterwards, a further loop is entered, essentially similar to the previous loop, in which, at each iteration, the total power $RTWP_j$ received in uplink by the generic cell $C_j$, over the whole useful frequency band, is calculated (block 740), in the way described above, and then the new values of the required transmission powers required to the UEs are calculated (block 745), for every pixel (m,n) of the area under planning, and for every network service s.

The loop is exited when a stability condition is reached, as far as the calculated UE transmission powers are concerned (decision block 750). In particular, the condition of stability is determined setting a power tolerance, which can be the same tolerance Toll_UE_Pw used before, and a stability condition is decreed to have been reached if, in passing from the generic (k−1) to the next k iteration of the loop, it results that:

$$|p_{(m,n),s}^{DCH}(k)_{dB} - p_{(m,n),s}^{DCH}(k-1)_{dB}| \leq \text{Toll\_UE\_Pw}$$

for each pixel (m,n) of the area under planning, and for each service s.

Figure 4:
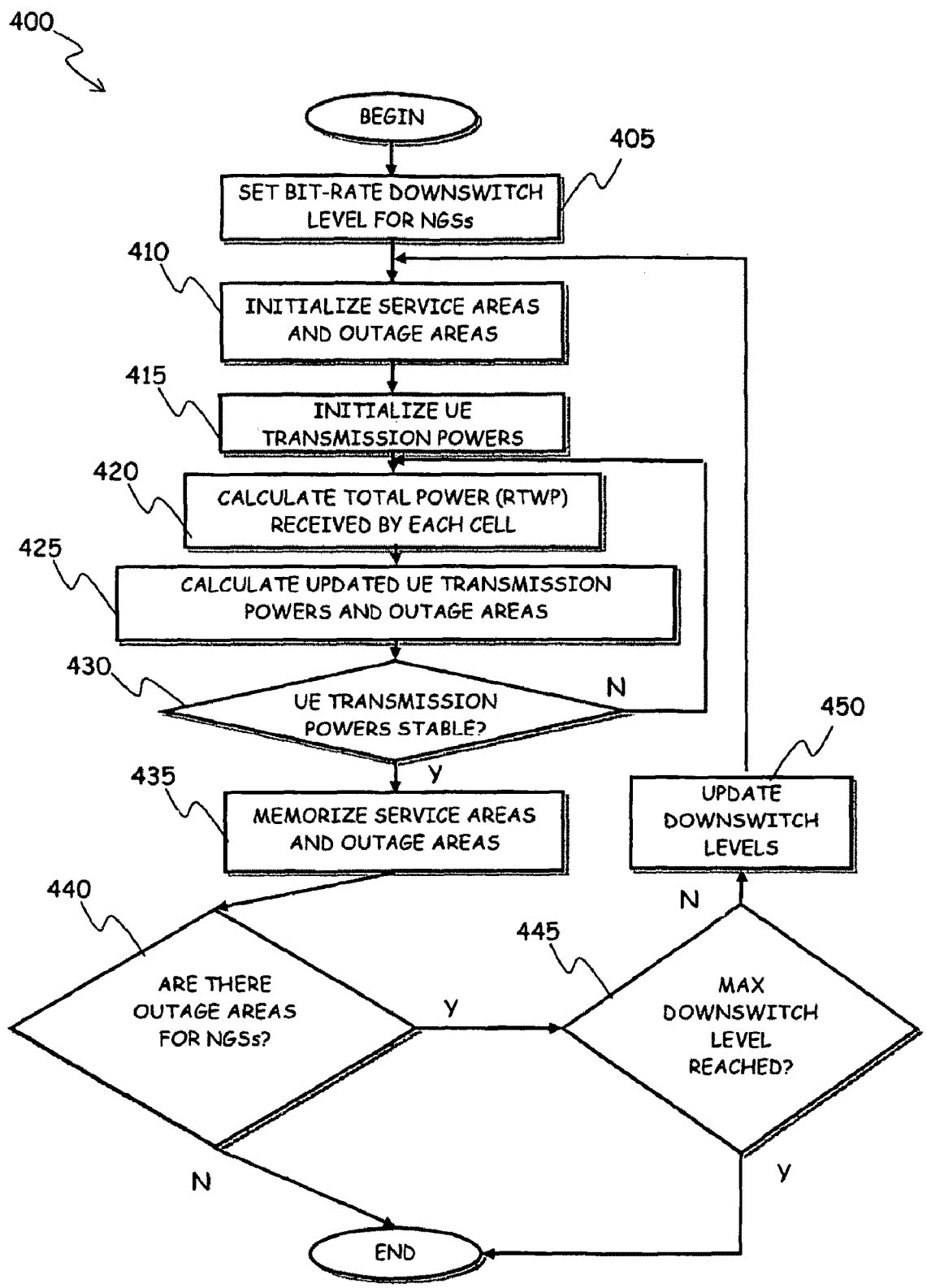
FIG. 4 is a schematic, simplified flowchart of an uplink power control method of the network planning process, according to an embodiment of the present invention.

When the second loop is exited, the procedure then goes on with block 435 of FIG. 4.

Thus, according to the embodiment of the present invention, the congestion control step 730 allows controlling the cell load in uplink, and to discard from consideration, from the current iteration of the uplink power control phase, a sub-set of pixels for each one of the cells that result to be overloaded (i.e., those cells for which the calculated load factor exceeds the maximum allowable load factor). In this way, it is avoided the need of performing the admission control phase preliminary to the uplink power control phase. The results of the uplink analysis performed according to the described embodiment of the invention are not affected by more or less realistic assumptions, as it was instead the case should the admission control phase be performed, particularly in respect of the interference in the uplink: the cell load is in fact controlled directly within the uplink power control phase.

Thanks to the present invention, the limitations in prior-art approaches to the uplink power control phase are overcome. In particular, the possibility of dividing, in the planning phase, the set of services into two categories: guaranteed bit-rate services, and non-guaranteed bit-rate services allows to more accurately define the service areas and in general to size the service areas in a way not excessively conservative, saving investments.

Although the present invention has been disclosed and described by way of some embodiments, it is apparent to those skilled in the art that several modifications to the described embodiments, as well as other embodiments of the present invention are possible without departing from the spirit or essential features thereof/the scope thereof as defined in the appended claims.

The invention claimed is:

1. A method for planning a cellular mobile telecommunications network comprising at least one network cell intended to provide network services to user equipment located in said network cell, wherein the network services comprise at least one network service deliverable at a plurality of provisioning rates, comprising evaluating an uplink coverage of the network in a predetermined service area of said network cell, said evaluating comprising:
   a) forecasting a number of user equipment located in said service area;
   b) setting a current provisioning rate to the highest of said provisioning rates;

c) estimating a power required for each user equipment for accessing the at least one network service at the current provisioning rate;
d) comparing the estimated required power to a maximum power deliverable by each user equipment and, if the estimated required power exceeds the maximum deliverable power;
e) determining a reduced service area wherein an estimated power required for each user equipment of a reduced number of user equipment for accessing the at least one network service at the current provisioning rate does not exceed the maximum deliverable power;
f) updating the current provisioning rate to the immediately lower provisioning rate of said plurality of provisioning rates;
g) repeating steps c) and d) and, if required, steps e) and f) until a predetermined criterion is met; and
h) forming, within the predetermined service area, a plurality of service sub-areas, wherein each service sub-area corresponds to one of the plurality of provisioning rates.

2. The method of claim 1, wherein the predetermined service area is established during an admission control phase of the planning, starting from a best-server cell service area for the at least one network cell, calculated on the basis of a power level of a predetermined channel.

3. The method of claim 2, wherein step c) comprises:
c1) initializing for the at least one network cell, a transmission power for each user equipment located in the service area;
c2) estimating a total power received by the at least one network cell from the user equipment located in the service area and using the at least one network service;
c3) based on the estimated total received power, varying the transmission power required to each user equipment located in the service area in order to reach a target quality of service constraint for the at least one network service; and
c4) iterating said steps c2) and c3) until a stability condition is reached wherein the transmission power variation for at least a predetermined fraction of the user equipment located in the service area is lower than a predetermined threshold.

4. The method of claim 3, wherein said transmission power for each user equipment is initialized to zero.

5. The method of claim 1, wherein the predetermined service area is a best-server cell service area for the at least one network cell, calculated on the basis of a power level at a predetermined channel.

6. The method of claim 5, wherein step c) comprises:
c1) initializing, for the at least one network cell, a service area and a transmission power for each user equipment located in the service area;
c2) estimating a total power received by the at least one network cell from the user equipment located in the service area and using the at least one network service;
c3) based on the estimated total received power, varying the transmission powers required to each user equipment located in the service area in order to reach a target quality of service constraint for the at least one network service;
c4) iterating said steps c2) and c3) until a stability condition is reached wherein the transmission power variation for at least a predetermined fraction of the user equipment located in the service area is lower than a predetermined threshold;
c5) calculating a total received power corresponding to the transmission powers at the end of step c4);
c6) calculating an uplink load factor corresponding to the total received power calculated in step c5);
c7) ascertaining whether the calculated uplink load factor is lower than a maximum uplink load factor, and, in the negative case:
c8) restricting said service area; and
c9) repeating said steps c2) to c7).

7. The method of claim 1, wherein step e) comprises:
e1) memorizing the reduced service area; and
e2) calculating a service outage area in respect to said at least one network service.

8. The method according to claim 1, wherein said comparing the estimated required power to a maximum power deliverable by each user equipment comprises:
varying the maximum deliverable power as a consequence of said updating the provisioning rate for the at least one service.

9. The method of claim 8, wherein said varying the maximum deliverable power comprises:
defining a first and at least one second maximum deliverable power threshold, the first power threshold being lower than the second power threshold;
initializing the maximum deliverable power to a value corresponding to the first power threshold; and
as a consequence of said updating the provisioning rate for the at least one service, setting the maximum deliverable power to the second power threshold.

10. A data processing system comprising at least one computer processor for carrying out the steps of the method according to claim 1.

11. A non-transitory computer-readable storage medium encoded with a computer program comprising instructions for carrying out all the steps of the method according to claim 1, when said computer program is executed on a computer system.

12. A cellular mobile telecommunications network comprising at least one network cell and configured to provide network services to users located in said network cell, wherein the network services comprise at least one network service, the network having a service area in respect to the at least one service obtained by applying the method according to claim 1.

* * * * *